United States Patent Office 2,718,543
Patented Sept. 20, 1955

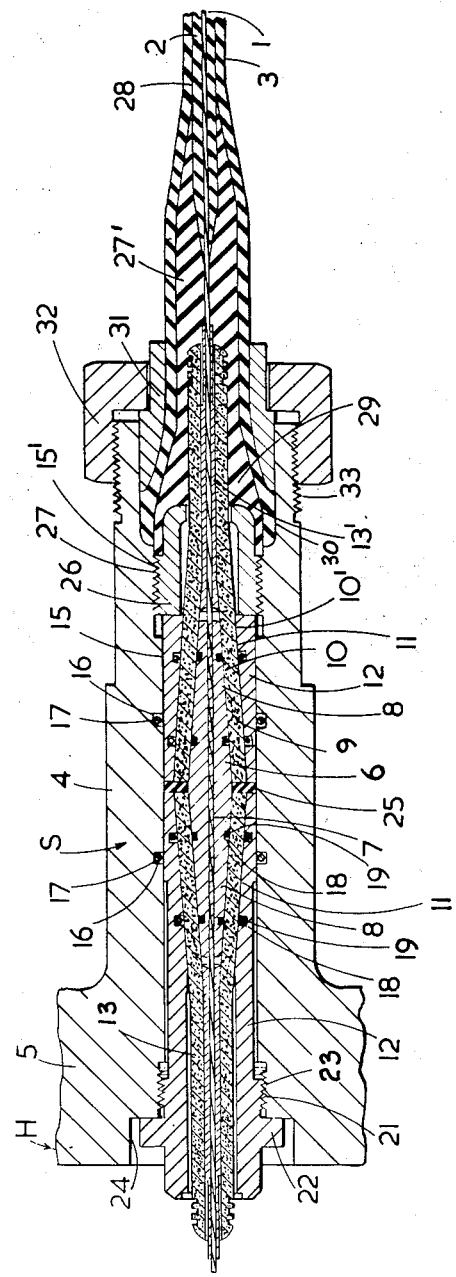

2,718,543

IMPROVEMENTS RELATING TO THE PRESSURE-TIGHT SEALING OF ELECTRIC CABLES INTO HOUSINGS

Aubrey Douglas Lidderdale, Bromley, England, assignor to The Telegraph Construction & Maintenance Company Limited, London, England, a company of Great Britain Application July 6, 1954, Serial No. 441,449

Claims priority, application Great Britain July 9, 1953

8 Claims. (Cl. 174—77)

This invention relates to insulated electric cables and is concerned with an improved means for providing an effective seal at the entry of the cable to a housing, e. g. the housing for repeater apparatus in a submarine communication cable where the interior of the housing or other container is at normal atmospheric pressure and the exterior and particularly the point of entry of the cable is subjected to high pressures of the order of that encountered at ocean depths.

The present invention is primarily intended for use in connection with insulated submarine signaling cables, provided with lump type repeater apparatus and is hereinafter described in detail in reference thereto.

One of the problems arising when employing present methods of sealing by moulding on an extension to and of the same material as the conductor insulating medium, such as for example—polythene, is that when subjected to high pressure "cold flow" takes place in the insulation and the extension thereof causing these to be forced away from the wall of the housing at the junction of the seal thereby affording entry to the high pressure medium and causing a collapse of the seal or a failure of the insulation.

According to the present invention, sealing means for use at the entry of a sheathed insulated conductor into a housing comprises a metal thimble tapering externally from a central section to each end and having a central bore of a size to fit the conductor, co-operating pairs of inner and outer sleeve elements fitting over each end of the thimble, the inner elements which are of insulating material, being tapered both internally to mate with the tapered portions of the thimble end and externally in the same direction and the outer elements which are of metal being a close fit within the entrance to the housing and being tapered internally to mate with the external faces of the inner elements, a series of sealing rings of resilient material located between adjacent faces of the thimble, sleeve elements and housing entrance, and screw operated means at one end of the housing entrance for imparting an endwise thrust to one of said outer sleeve elements in order to maintain in compression the sealing rings located between the tapered faces.

Further sealing means in the form of a resilient washer is preferably mounted on the thimble at its point of maximum diameter so as to provide radial seating faces between the adjacent inner ends of the sleeve elements.

In order to set up the necessary axial thrust, means is provided for holding the outer sleeve element of the pair of sleeve elements which are innermost next the entry to the interior chamber of the housing against endwise displacement.

For this purpose, the outer sleeve element may be provided with a screw threaded portion to engage a correspondingly screw threaded recess at the inner end of the housing entrance, the sleeve element being formed with a shoulder. At the outer end of the housing entrance is a similar screw threaded recess to receive a collar nut by which the necessary thrust can be applied to the outer end of the outer sleeve element so that on tightening the collar nut it will apply pressure to the sealing washer and sealing rings.

According to a further feature of the invention, the seal is completed by means of a moulding formed of plastic material which encloses the central conductor, the outer end of the inner sleeve element and the collar nut. This moulding may be of polythene or other material capable of forming an effective bond with the polythene or other insulation of the cable and surrounding the moulding is an outer layer of rubber or material known under the trade name "neoprene."

This moulding together with the outer insulation layer is housed partly within the cable entry recess and for this purpose the latter may be provided with a counterbore, the diameter of which is sufficient to accommodate the thickness of the moulding and of the outer insulation.

Preferably the moulding, which encloses the head of the collar nut, is tapered in a direction axially along the cable away from the housing and there is provided a metal bush having a corresponding tapered interior surface to fit over the outer rubber or "neoprene" insulation so that by means of a screw cap fitting on to the housing, it is possible to apply pressure to the bush in an axial direction, so as to prevent any tendency of creep or cold flow of the moulding.

One embodiment of the invention is illustrated in the accompanying drawing which is a section view showing a preferred seal in accordance with a preferred embodiment of the invention.

The housing H which is cylindrical includes an end wall 5 having a tubular extension 4, the extension 4 functioning as the entrance to the housing for the conductor 1, the sealing means S being located inside the extension.

The sealing means according to this invention comprises an inner and central metal thimble or ferrule 6 formed with an axial bore 7 to receive the end of the conductor. The thimble 6 tapers externally from a central section to each end as at 8 and enclosing the tapered faces 8 of the thimble is a co-operating pair of insulator elements 9 hereinafter termed the inner elements and comprising a central taper portion merging with cylindrical portions 13 of uniform cross-section. The central taper portions are tapered internally as at 10 to mate with the tapered faces 8 of the thimble. The outer face of the central section of the inner element is also tapered in the same direction as at 10' to mate with a tapered inner face 11 of one of a pair of outer insulator support elements 12 hereinafter termed the outer elements and which serve to support the inner insulator elements 9.

The cylindrical ends 13 of the inner elements extend beyond the ends of the outer elements 12 and the housing extension 4. Inside each of the ends 13 is a steel liner 13' along the axis of which is a passage through which the conductor 1 passes.

The inner elements 9 are of insulating material, preferably ceramic, and the outer elements 12 are of metal. The external face of the outer elements 12 and the internal face 15 of the housing extension 4 are accurately machined so that they are close fits one within the other. In the internal face of the extension 4 are grooves 16 in which are located resilient sealing rings 17 and similarly there are grooves 18 in the tapered faces of the thimble 6 and the outer elements 12 in which are located resilient sealing rings 19. Preferably two sealing rings are provided between each of the tapered faces of the thimble and of the inner and outer elements.

In the embodiment illustrated the outer element 12 which is next the interior of the repeater casing H is formed with a locating flange 22 and has a screw threaded portion 21 so that the element may be screwed into a correspondingly screw threaded portion 23 of the extension 4 until the flange 22 abuts the shoulder formed by a counter-bore 24 in the extension. The other outer element 12 is reduced in length and against its outer end there bears a collar nut 26, the nut having externally a screw threaded portion 27 to engage with a corresponding screw threaded recess 15' in the housing extension 4.

Between the opposite ends of each pair of inner elements 9 and outer elements 12 is a resilient sealing washer 25.

By screwing the nut 26 down the extension endwise pressure may be exerted on the adjacent outer element 12 which, by reason of the tapered faces, is thus pressed against the corresponding inner element 9. Again by reason of the tapered faces, the pressure exerted by this inner element is transmitted to the thimble 6 and thus through the other inner element to the other outer element which is fixed in screw threaded engagement with the housing extension 4. Thus by screwing up the collar nut 26 and imparting an endwise thrust to one outer member the arrangement of tapered faces results in the inner elements 9 being pressed against the outer elements 12 and thimble 6 and in consequence the sealing rings 19 between the tapered faces are subjected to compression. Similarly the opposed endwise thrust between the pairs of inner and outer elements causes the sealing washer 25 to be compressed.

The seal is completed by a moulding 27' which is tapered axially, the moulding, which is of plastic insulating material, e. g. polythene, being bonded at its tail end as at 28 to the insulating material 2 surrounding the conductor 1. The sheath 3 is used, if necessary being extended for this purpose, to provide a cover for the outer surface of the moulding 27', the head 29 of which is located in a counter-bore 30 at the outer end of the housing extension 4. The head 29 of the moulding is retained in position in the counter-bore by an internally tapered collar 31 which may be urged against the moulding by a screw threaded cap 32 which engages with a screw threaded portion 33. In use in order to complete the seal of this invention the cable end is prepared by stripping back the insulation, following which the external parts of the seal namely the nut 32, collar 31, the inner collar nut 26 and the metal thimble or ferrule 6 are assembled together with one of the steel liners 13', and one of each of the inner insulator elements 9 and its associated outer element 11.

The several parts are passed in the correct sequence over the end of the conductor with the sealing rings 17 and 19 in their respective grooves.

When the parts are in position the thimble 6 is fixed to the conductor by brazing and having positioned the sealing rings 17 together with the central washer 25 the complementary inner insulator element 9 and liner 13' being passed over the end and along the conductor into engagement with the thimble 6.

The next step is to engage the outer element 11 by screwing it into the screwed portion 23 of the container wall 5 with all three sets of sealing rings 19, 17 in position.

Tightening of the seal is now carried out from the right hand, as seen in the drawing, through the collar nut 26 which is screwed home to force the shorter outer element 12 to meet the thimble 6.

The molding 27' of material identical with the conductor insulation is now made—bonding to the end of the conductor insulator and enclosing the end of the collar nut 26. The sheath 3 and the collar 31 are finally positioned over moulding 27' and the whole locked with nut 32.

It can now be seen that the effect of "cold flow" in either the conductor insulation or the moulding 27' can have no effect upon the seal between the conductor and the container H, and that furthermore any distortion due to "cold flow" which may take place in the moulding 27' is balanced by the resilience of the sleeve 3.

What is claimed is:

1. Sealing means for use at the entry of a sheathed insulated conductor into a housing comprising a metal thimble tapering externally from a central section to each end and having a central bore of a size to fit the conductor, cooperating pairs of inner and outer sleeve elements fitting over each end of the thimble, the inner elements, which are of insulating material, being tapered both internally to mate with the tapered portions of the thimble end and externally in the same direction and the outer elements, which are of metal, being a close fit within the entrance to the housing and being tapered internally to mate with the external faces of the inner elements, a series of sealing rings of resilient material located between adjacent faces of the thimble, sleeve elements and housing entrance, and screw operated means at one end of the housing entrance for imparting an endwise thrust to one of said outer sleeve elements in order to maintain in compression the sealing rings located between the tapered faces.

2. Sealing means as claimed in claim 1 having means at the outer end of the housing entrance for compressing the conductor sheathing about a moulding of insulating material surrounding the entrance of the conductor into the sealing means.

3. Sealing means as claimed in claim 1 in which a resilient sealing washer is provided between the adjacent inner ends of each pair of sleeve elements.

4. Sealing means as claimed in claim 1, in which the outer ends of the inner elements extend beyond the corresponding ends of the thimble and outer elements.

5. Sealing means as claimed in claim 4 in which the inner element adjacent the point of entry of the conductor into the seal extends through a collar nut in screw threaded engagement with the inner face of the housing entrance, by means of which nut endwise thrust is applied to the outer elements.

6. Sealing means as claimed in claim 5 in which a moulding of plastic insulating material, which is bonded to the insulating layer around the conductor, encloses the outer end of the inner element and of the collar nut, the conductor sheathing being maintained in contact under pressure with the moulding and the housing entrance by screw operated means on the housing.

7. Sealing means as claimed in claim 6 in which the moulding is tapered in a direction along the conductor away from the housing, the head of the moulding and the overlying conductor sheathing being wedged in a counter-bore at the outer end of the housing entrance by a metal bush fitting over the sheathed head of the moulding, the bush being pressed into the counter-bore to retain the head of the moulding therein by a screw cap fitting onto the housing.

8. Sealing means as claimed in claim 4 in which the outer ends of each of the inner elements are lined with a metal sheath through which the conductor passes.

No references cited.